SYSTEM FOR ANALYSING THE SPATIAL DISTRIBUTION OF A FUNCTION

Original Filed Aug. 28, 1958 5 Sheets-Sheet 1

INVENTOR
WILFRED KENELM TAYLOR

BY Francis J. Thomas
ATTORNEY

United States Patent Office 3,229,236

Patented Jan. 11, 1966

3,229,236
SYSTEM FOR ANALYSING THE SPATIAL DISTRIBUTION OF A FUNCTION

Wilfred Kenelm Taylor, Chiswick, London, England, assignor to International Business Machines Corporation, New York, N.Y., a corporation of New York Original application Aug. 28, 1958, Ser. No. 757,873. Divided and this application Nov. 13, 1963, Ser. No. 327,573

Claims priority, application Great Britain, Aug. 29, 1957, 27,274

2 Claims. (Cl. 338—77)

This invention relates to a system for analysing the spatial distribution of a variable quantity or function.

This application is a division of my copending application, Serial No. 757,873, filed on August 28, 1958, and issued on June 1, 1965, as U.S. Patent No. 3,187,304 which, in turn, is a continuation-in-part of my application Serial No. 565,272, filed on February 13, 1956, and issued on January 9, 1962, as U.S. Patent No. 3,016,518. In U.S. Patent No. 3,016,518 there is described a system in which signals derived from a spatial distribution are modified in such a manner that the largest signals are obtained from those zones in the distribution over which the function changes in magnitude or spatial configuration while smaller signals are obtained from those zones over which the magnitude of the quantity is relatively constant. To this end it was proposed to apply the signals each through an amplifier to a respective output terminal of a resistance matrix comprising a plurality of pairs of output and feedback terminals and to apply to the input of each amplifier a signal obtained from the respective feedback terminal by cross connecting each such terminal with a selected number of the output terminals of the matrix.

It is an object of the present invention to provide an improved arrangement which enables the signals which are derived from those zones of the distribution where the quantity is relatively constant to be more easily eliminated.

A further object of the invention is to provide an arrangement which avoids the use of feedback and enables undesired signals to be eliminated without risk of instability.

It is also an object of this invention to provide an improved organisation and construction of the resistance matrix whereby its manufacture is facilitated.

Figure 1:
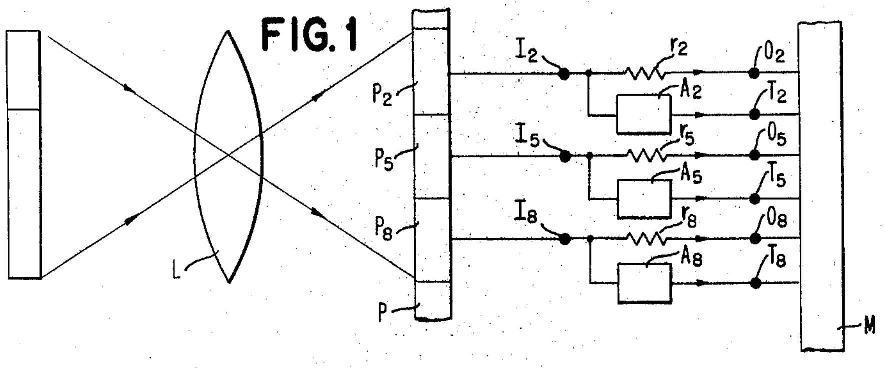
Figure 2:
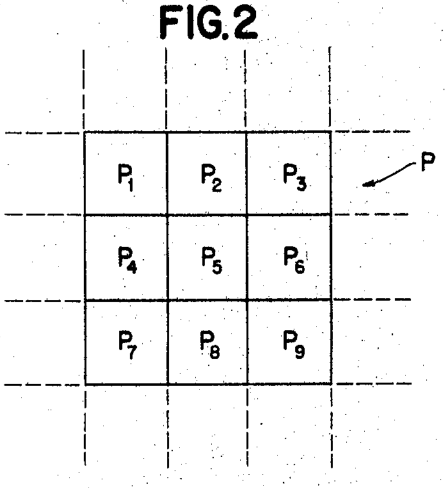
Figure 7:
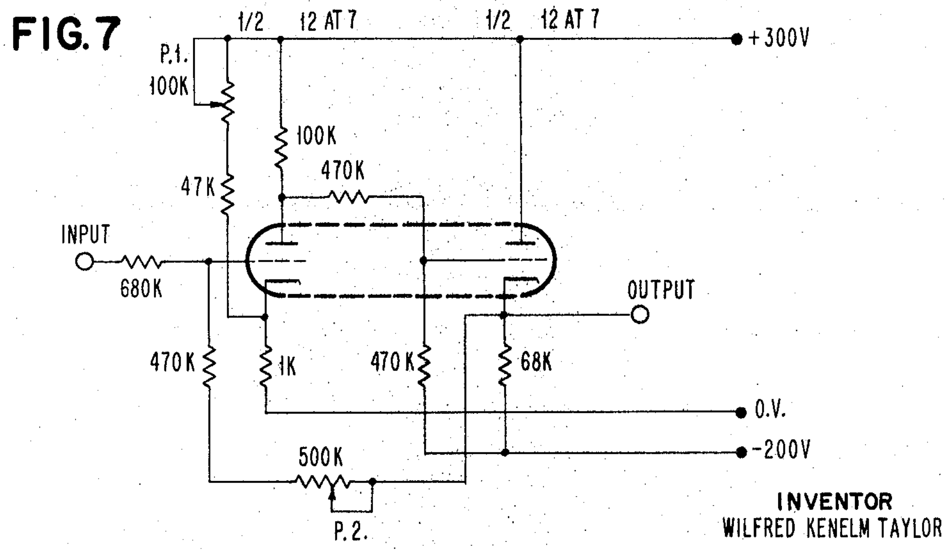
Figure 3:
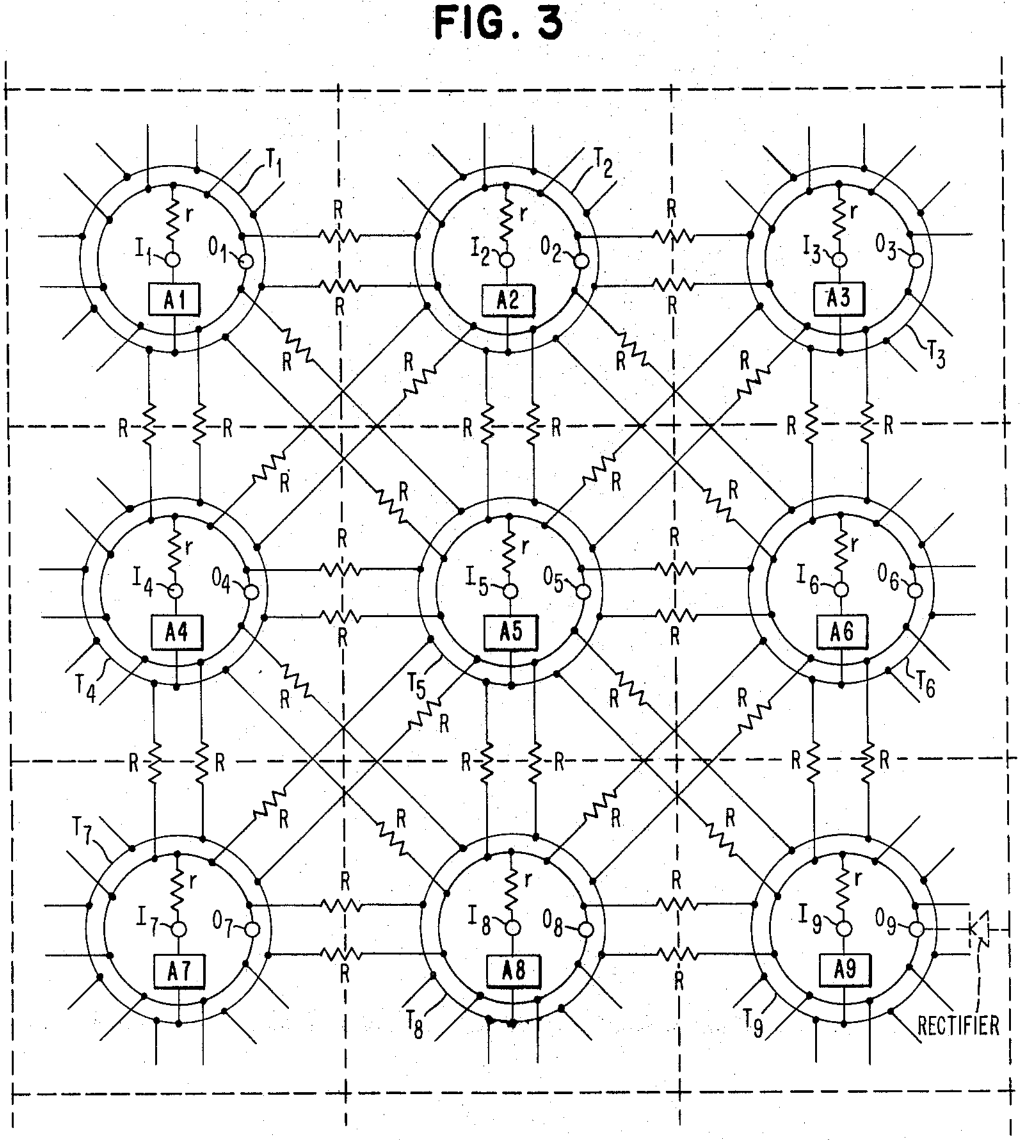

Other objects and advantages of the present invention will become apparent during the course of the following description of one embodiment of the invention with reference to the accompanying drawings, in which:

FIGURE 1 is a diagrammatic representation of the system of this invention showing a matrix of light sensitive transducers and a matrix of resistors, FIGURE 2 is a plan view of part of the transducer matrix of FIGURE 1, FIGURE 3 shows one form of a resistance matrix, FIGURES 4a–4c and 5a–5c shows typical signal patterns obtained by the operation of the invention, FIGURES 6a–6e illustrate one constructional form of the matrix, and FIGURE 7 is a wiring diagram of an amplifier.

In the system of the invention signals derived from a spatial distribution of a variable quantity or function are each applied after amplification and change of sign or polarity to respective first terminals, hereafter called transfer terminals, of a resistance matrix, while a fraction of each signal is applied directly to respective second terminals, hereafter called output terminals, of the matrix, the first and second terminals being interconnected by resistors in a manner to be described in detail below.

In one form of the system of this invention, the terminals are arranged in the form of a matrix of equally spaced rows and columns but in general any suitable geometrical arrangement may be employed. For the purpose of description the input signals will be taken to be voltages that are supplied by light sensitive transducers and it will be assumed that the voltage supplied to any input terminal is proportional to the integrated light intensity falling on the transducer situated at a corresponding position in a matrix of transducers. With this arrangement uniform illumination of all the transducers will cause equal signal voltages, denoted by $i$, to appear at all the input terminals of the apparatus, assuming that there is a one to one correspondence between transducers and input terminals. In general, however, the input signals may be derived from any suitable sources.

The basic operation of this form of the invention will be described with the aid of FIGURES 1 to 3. For the sake of clarity only a part of the apparatus is shown in these figures but this includes a complete pattern of connections and apparatus of any size may be constructed by repeating the section shown in FIGURE 3 without limit, the sections being joined together by connections of the type that are discontinued in this figure.

Referring firstly to FIGURES 1 and 2, there is shown a matrix of nine light sensitive transducers $P_1$ to $P_9$ onto which an image of the letter T, for example, is projected by optical means L. The output of each light sensitive transducer is applied as an input signal to the respective input terminals $I_1$ to $I_9$ and is transmitted to the resistance matrix M on the one hand through resistors $r_1$ to $r_9$ to the output terminals $O_1$ to $O_9$ and on the other hand through amplifiers $A_1$ to $A_9$ to the transfer terminals $T_1$ to $T_9$.

The input signal voltages supplied to the nine input terminals $I_1, I_2, \ldots I_9$ will be denoted by $i_1, i_2, \ldots i_9$ and the output signal voltages of the apparatus obtained at the nine output terminals $O_1, O_2, \ldots O_9$ are denoted by $o_1, o_2, \ldots o_9$. It will be observed that a fraction of the voltage $i_n$ ($n$ taking all possible values corresponding to input terminals) is supplied through a resistor of $r$ ohms to the $n$th output terminal where it contributes to the output voltage $o_n$. In this form of the apparatus the contribution is equal to $i_n.R/(R+8r)$. The input voltage $i_n$ is also supplied to an amplifier $A_n$ of gain $|G|$, there being one amplifier for each input terminal. All amplifiers $A_1$ to $A_9$ are similar and multiply the input voltage supplied to them by $|G|$ and also change its sign or polarity. Thus if an input $i_n$ is one volt positive and $|G|$ is 2, the output of the amplifier supplied by $i_n$ is $-2$ volts. The output of each amplifier is taken to transfer terminal T, shown for convenience in FIGURE 3 as the outer conductive ring, and which is connected through eight equal resistors of R ohms to each of the eight nearest output terminals O of the matrix. Likewise the output terminals O, shown for convenience as inner conductive rings, are connected through eight resistors of R ohms to each of the eight nearest transfer terminals T, excluding in this instance the concentric outer ring, although in other forms of the apparatus it may be convenient to include a ninth resistor between the concentric rings. In FIGURE 3 the eight resistors connected to the transfer terminal $T_5$ which is supplied by the amplifier $A_5$ connected to input terminal $I_5$ are connected to the eight output terminals numbered 1, 2, 3, 4, 6, 7, 8 and 9 and this pattern is repeated for all outer rings.

The output impedance of each amplifier is made much smaller than R so that the effect of loading may be neglected and the contribution to the output voltage $o_5$ from any one of the eight inputs $i_n$ ($1 \leqslant n \leqslant 9$, $n=5$) is $-i_n|G|r/(R+8r)$.

The elimination of input signals over regions of constant signal amplitude is achieved by choosing appropriate values of $|G|$, $r$ and R. In this example of the apparatus the only condition that has to be met is that R should be equal to $8|G|r$ and if $|G|$ is unity this requires $r$ to be one-eighth of R. Apparatus satisfying this condition gives zero output at all terminals O for any size of input signals, providing only that all input signals are either equal or differ by equal amounts from one input terminal to the next in each horizontal, vertical or diagonal row of the matrix. This property breaks down at the edge of the matrix but since outputs near the edge can be discarded this is not important.

If all inputs are equal the outputs are zero (except at the edges of the matrix) but if one input anywhere within the matrix increases above the rest by any amount $+\Delta$ the corresponding output changes from zero to $+\Delta/2$. This is not the only change produced, all the eight outputs surrounding this non-zero output also become non-zero but in the opposite sense and by a smaller amount $-\Delta/16$. These negative outputs can be eliminated wherever they occur by connecting a unidirectional conductive device such as a rectifier or thermionic diode from each of the output terminals to the zero voltage reference point which may be taken as earth potential. If negative outputs are to be prevented, the rectifiers are connected between all the output terminals O and earth as illustrated at $O_9$ in FIGURE 3, but the rectifiers must be connected the opposite way round if the input signals are negative and positive outputs are to be prevented.

The operation of the invention with a more complex pattern of input signals will now be explained with reference to FIGURES 4*a*–4*c* and 5*a*–5*c*. In this case it is assumed that the matrix of light sensitive transducers consists of forty-nine transducers and that the resistance matrix is correspondingly increased as compared with the arrangement of FIGURES 1 to 3, the connections of the matrix being, however, the same as shown in those figures. FIGURES 4*a* and 5*a* show a pattern of input signal amplitude applied to the input terminals I while FIGURES 4*b* and 5*b* show the pattern of signal amplitude developed at the output terminal O under one condition and FIGURES 4*c* and 5*c* show the pattern of signal amplitude developed at the output terminals under another condition.

Figure 4C:
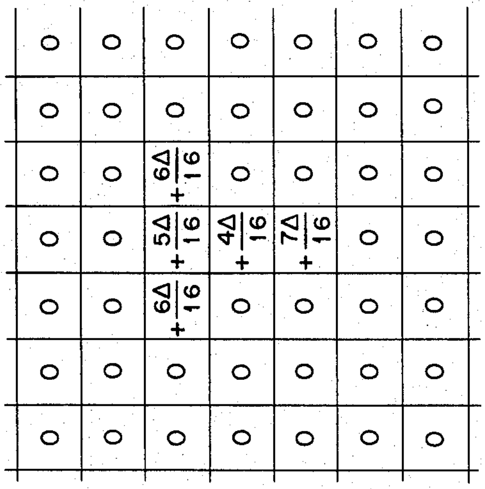
Figure 4B:
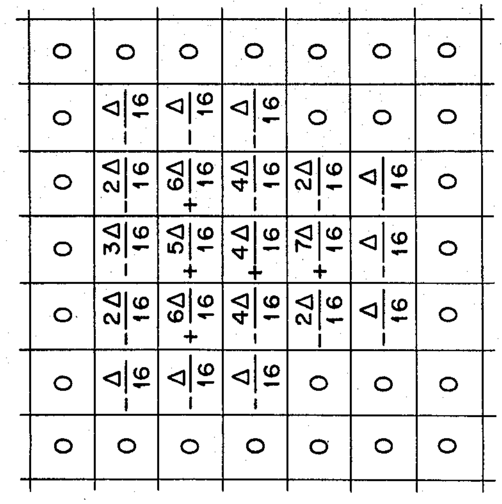
Figure 4A:
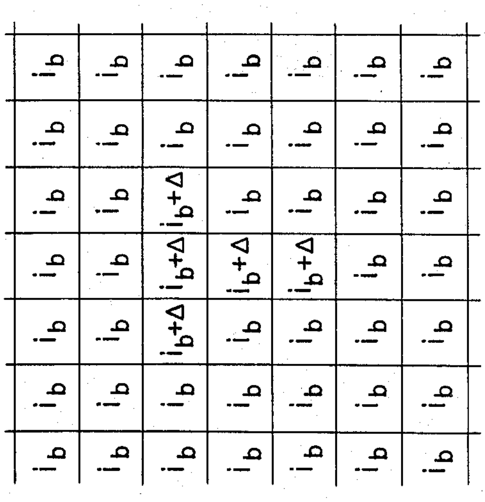
Figure 5C:
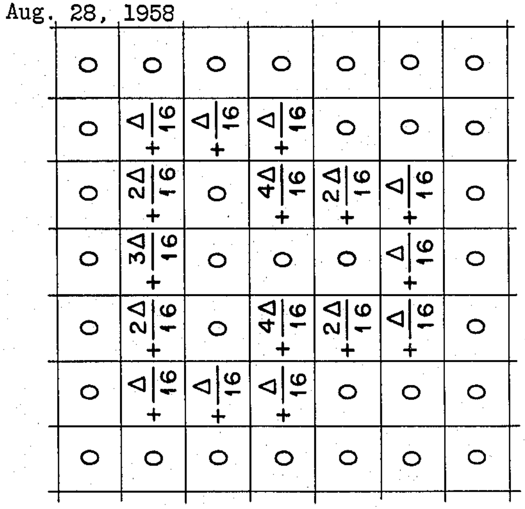
Figure 5B:
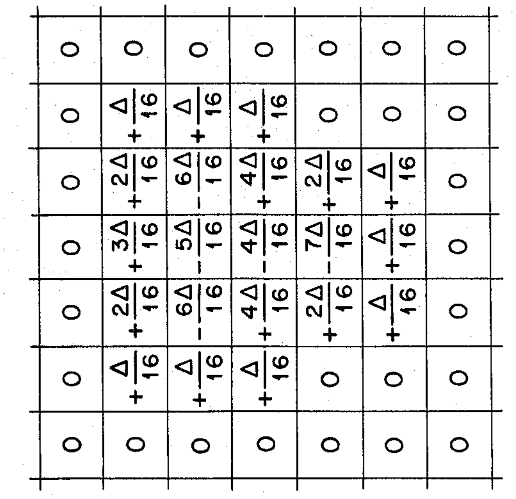
Figure 5A:
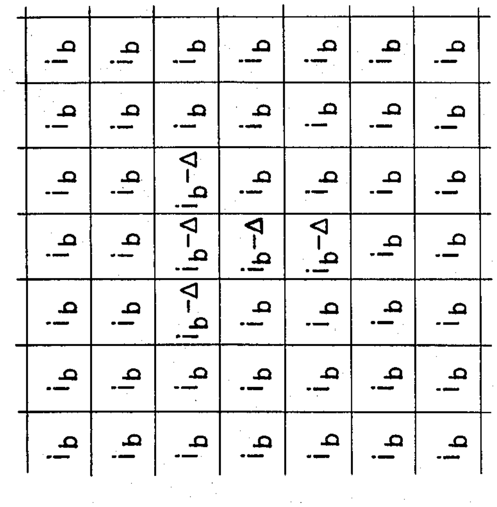

Referring first to FIGURES 4*a*–4*c*, the input pattern shown in FIGURE 4*a* is formed by adding an amount $\Delta$ to input terminals 17, 18, 19, 25 and 32, this being in addition to a background signal $i_b$ which is supplied to all input terminals and which is to be eliminated by the apparatus. It will be noted that the pattern of signals $\Delta$ correspond to a T of intensity $i_b+\Delta$ in a darker background of intensity $i_b$. The function of the apparatus is firstly to separate the T from its background, thus preventing the background signals that do not contain any useful information about the pattern from overloading or otherwise interfering with subsequent apparatus that may be used to analyse the pattern further. Given the same values of $|G|$ and $r$ used in the last example, the output signals without the rectifiers are as shown in FIGURE 4*b* and with the rectifiers connected to eliminate negative signals only the positive outputs shown in FIGURE 4*c* remain. The T is thus isolated from the background but is slightly distorted in intensity, the extremities of the letter giving rise to larger voltages than the central parts. This type of distortion is an advantage in some applications of the apparatus and represents a partial elimination of the central parts that would increase if the T were increased in size to cover a larger number of light-sensitive transducers until eventually output signals corresponding to the central parts of a large T would become zero, leaving non-zero output signals round the outline of the shape.

The apparatus will also operate correctly when a pattern at the input is darker than its background as it usually is in printing, the pattern of a letter of the alphabet printed in dark ink on white or grey paper giving rise to signals of intensity $i_b-\Delta$ and the paper itself giving rise to the background signals $i_b$. Thus a dark grey T on light grey paper will produce input signals that are equal everywhere to $i_b$ except for inputs $i_{17}$, $i_{18}$, $i_{19}$, $i_{25}$ $i_{32}$ which become $i_b-\Delta$. The inputs and outputs corresponding to this example are shown in FIGURES 5*a*–5*c* which correspond to FIGURES 4*a*–4*c*.

The form of the resistance matrix shown in FIGURE 3 may be constructed in the conventional way by soldering resistors and amplifiers to the conducting ring terminals but this involves considerable labour if a large number of input terminals is employed.

An embodiment of the matrix that gives the results already described but which is relatively simple from a constructional standpoint wil now be described with the help of FIGURES 6*a*–6*e*. A slab of insulating material S has grooves G formed in the surface to a suitable depth, which in FIGURE 6*e* can be seen to be half the thickness of the slab. The width of the grooves is small compared with the separation of the input terminals, the positions of which are assumed to be marked out in rows and columns on the surface of the slab. Grooves are formed along every alternate row and along every alternate column of terminal points and further grooves are cut at 45 degrees to the horizontal and vertical grooves so as to pass through their intersection points. The grooves may be cut into the insulating slab or they may be obtained by a moulding process or by any other convenient means. The width and depth of the grooves may be varied throughout their length and they may be completely submerged in the insulating material to form what might be called tunnels.

The grooves G are filled with a resistive material to form a network of interconnected resistors or resistive pathways. A conducting disc D is arranged to make contact with the resistive material in the grooves at each terminal point. The disc may be evaporated or electrically deposited on to the block or it may be replaced by a metal plug that is inserted into a hole drilled into the block. Two holes H are drilled though each disc and through the underlying resistive and insulating material. As shown, one hole is made larger than the other and their positions are the same in each disc that is not situated at a meeting point of a horizontal, vertical and two diagonal grooves. At such points the positions of the larger and smaller holes are interchanged. Four slabs constructed in this manner are required to construct the form of matrix shown in FIGURE 3. Before the four slabs are assembled they are moved relative to each other until they occupy the positions shown in FIGURE 6*e*. The edges of the slabs will then be slightly out of line but as already stated the edges of the distribution of signals are not used and the edges of the slabs may be cut level if desired.

Figure 6A:
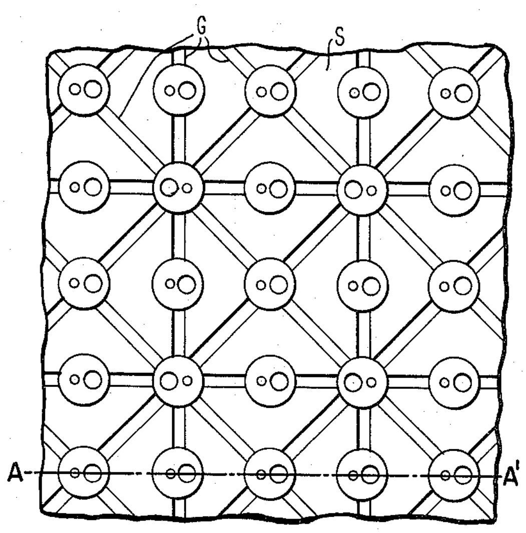
Figure 6B:
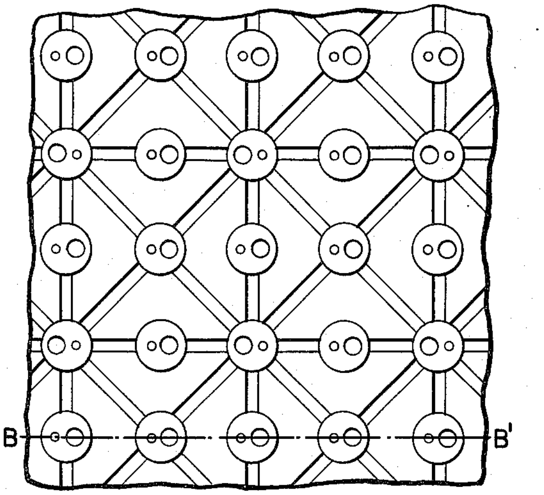
Figures 6C, 6D, 6E:
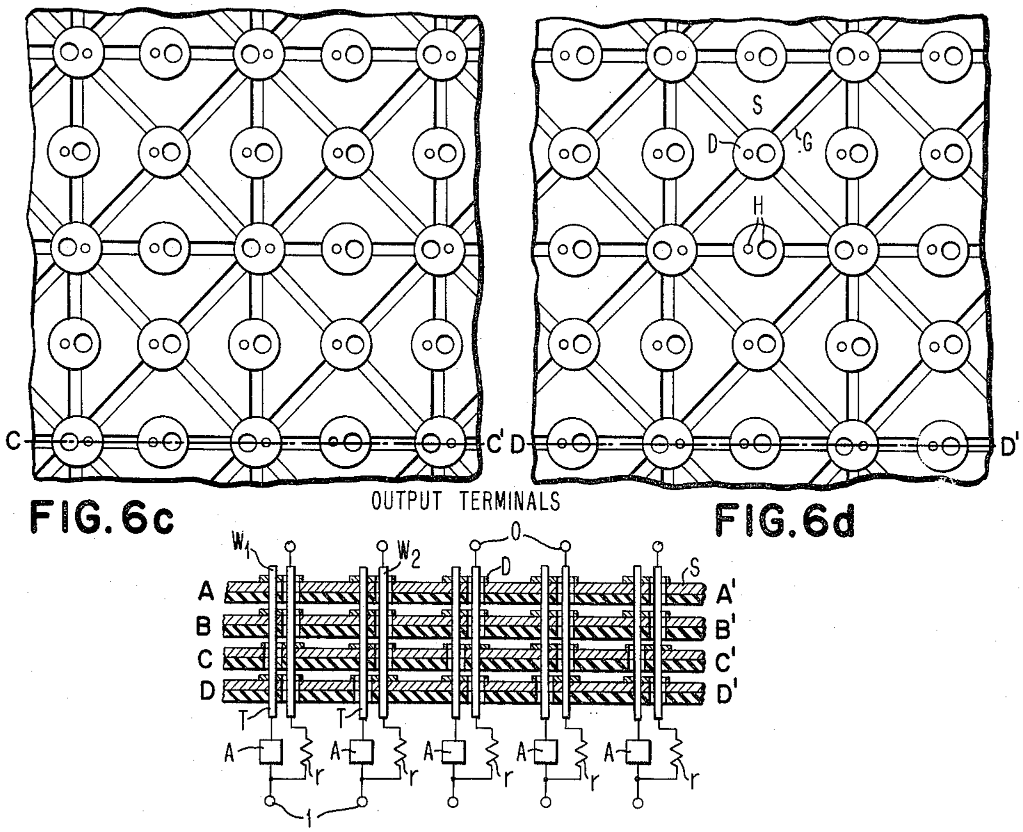

With the four slabs arranged one above the other, as illustrated in the side sectional elevation of FIGURE 6*e*, conducting wires or rods W are pushed through all the sets of four holes until they occupy the positions shown. The wires are a push fit in the smaller holes and so make contact with the discs D wherever a small hole occurs. The diameter of the larger holes in somewhat greater than the diameter of the wires and no contact is made when a wire passes through a large hole. In FIGURE 6*e* the wires $W_1$ on the left of each pair form the transfer terminals T and are connected to input terminals I each through amplifier A and the wires $W_2$ on the right of each pair are connected to output terminals O. The resistors labelled $r$ in FIGURES 1 and 3 are seen connected between the input and output terminals in FIGURE 6*e*.

The resistance of a groove of length $l$, width $w$ and depth $d$ containing material of resistivity $p$ is equal to $pl/wd$ and if $w$ and $d$ are constant throughout the slab the resistance of all paths between terminals is not the same, as it is in the arrangement described with reference to FIGURE 3 but has the value $R_1=pl/wd$ for horizontal and vertical paths and the value $R_2=p\sqrt{2}l/wd$ for diagonal paths, $l$ being the shorter distance between neighboring signal points on horizontal or vertical rows and columns. It can be shown that the apparatus will function as required with $R_2$ greater than $R_1$ although these resistances could easily be made equal by increasing the width of the diagonal grooves $\sqrt{2}$ times. Whether $R_2$ is greater than $R_1$ by the $\sqrt{2}$ or equal thereto, these resistors are effectively equal-valued since as above noted the apparatus will function as required under either circumstance.

Many variations, elaborations and simplifications of the pattern of connectivity given in FIGURE 3 and FIGURES 6*a*–6*e* will give the desired property of converting a set of inputs which are either equal or differ by equal amounts from one terminal to the next in horizontal, vertical or diagonal rows, over a large area to zero outputs but the second property whereby small superimposed signals produce outputs is modified in general by changes in the pattern of connectivity. The apparatus may for example be simplified by omitting all diagonal connections or it may be made more elaborate by introducing horizontal, vertical and diagonal connections in excess of those shown so that a given output terminal receives signals from some or all of the sixteen amplifiers that surround the eight amplifiers nearest to the output considered. The choice of the number of surrounding amplifier outputs that will contribute towards the resultant signal at any output terminal depends on the size of the super-imposed input patterns that are of interest in any particular application. As a general guide it can be said that the eight connections to surrounding amplifiers shown in FIGURES 3 and 6*a*–6*e* will be sufficient for many applications but that this number may be increased if large input signal patterns are to be analysed.

A suitable circuit for the amplifiers A, giving the required reversal of sign or polarity and a gain of unity, is shown in FIGURE 7. It comprises a double triode valve, the first half of which gives the required gain and change of sign of the input signal voltage, while the second half acts as a cathode follower to give a low impedance output signal. The gain is adjusted by means of the variable resistor P2 and the output voltage is set to zero when the input is zero by means of the variable resistor P1.

What I claim is:

1. A resistance matrix for use in analysing a plurality of signals representative of a spatial distribution of a variable quantity comprising a plurality of sheets of insulating material, each said sheet having a plurality of electrically conductive terminal portions regularly arranged in rows and columns and electrically resistive paths extending between said terminal portions along alternate rows and columns and diagonally between the intersection of said paths, means for mounting said sheets with said terminal portions in superposed relationship, and means for connecting certain of the terminal portions in each superposed set with a first terminal and the other terminal portion of the set with a second terminal.

2. A resistance matrix for use in analysing a plurality of signals representative of a spatial distribution of a variable quantity comprising a plurality of sheets of insulating material, each said sheet having a plurality of electrically conductive terminal portions regularly arranged in rows and columns and electrically resistive paths extending between said terminal portions along alternate rows and columns and diagonally between the intersection of said paths, means for mounting said sheets with said terminal portions in superposed relationship, and terminal means extending through each superposed set of terminal portions and in electrical contact with certain of said portions.

References Cited by the Examiner

UNITED STATES PATENTS

| | | | |
|---|---|---|---|
| 1,767,715 | 6/1930 | Stoekle | 338—308 X |
| 2,629,166 | 2/1953 | Marsten et al. | 338—309 X |
| 2,884,508 | 4/1959 | Czipott et al. | 338—309 X |

RICHARD M. WOOD, *Primary Examiner.*